United States Patent [19]

van der Burgt

[11] Patent Number: 4,548,529

[45] Date of Patent: Oct. 22, 1985

[54] PROCESS FOR TRANSPORTING PARTICULATE MATERIAL FROM A LOW PRESSURE ZONE TO A GAS-CONTAINING ELEVATED PRESSURE ZONE

[75] Inventor: Maarten J. van der Burgt, The Hague, Netherlands

[73] Assignee: Shell Oil Company, Houston, Tex.

[21] Appl. No.: 579,738

[22] Filed: Feb. 13, 1984

[30] Foreign Application Priority Data

Feb. 14, 1983 [NL] Netherlands ............... 8300554

[51] Int. Cl.⁴ .................. B65G 53/44; B65G 53/48
[52] U.S. Cl. ........................... 406/53; 406/197; 406/124; 406/77
[58] Field of Search ............... 406/53, 77, 124, 197, 406/198, 81; 414/217, 218

[56] References Cited

U.S. PATENT DOCUMENTS

| | | |
|---|---|---|
| 3,489,464 | 1/1970 | Hans-Jurgen . |
| 3,775,071 | 11/1973 | Hoffert et al. ............ 414/218 X |
| 4,247,240 | 1/1981 | Schova, Jr. et al. ............ 414/218 |
| 4,401,402 | 8/1983 | Casperson ............ 414/218 |

Primary Examiner—Jeffrey V. Nase
Assistant Examiner—L. E. Williams
Attorney, Agent, or Firm—Albert J. Adamcik

[57] ABSTRACT

Coal powder is transported from a low pressure zone to an elevated pressure zone by
 passing the powder from the low pressure zone to the top of the first one of a number of vertical vessels;
 passing the powder in each vessel by gravity as a moving bed from the top of the vessel to the bottom thereof;
 passing the powder from the bottom of each vessel but the last one to the top of the subsequent vessel by mechanical or pneumatic means;
 discharging the powder from the bottom of the last vessel to the elevated pressure zone.

14 Claims, 1 Drawing Figure

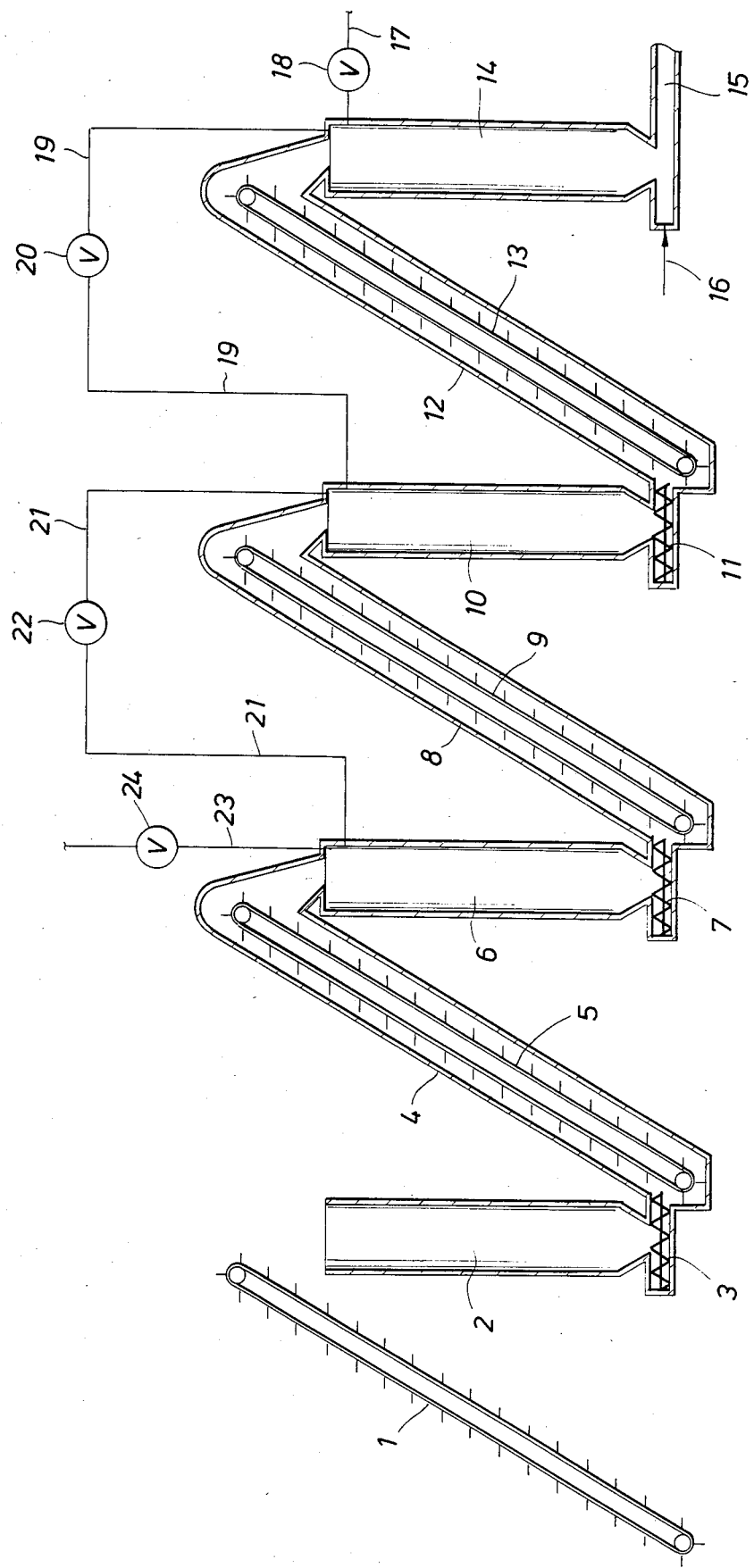

PROCESS FOR TRANSPORTING PARTICULATE MATERIAL FROM A LOW PRESSURE ZONE TO A GAS-CONTAINING ELEVATED PRESSURE ZONE

BACKGROUND OF THE INVENTION

The transport of particulate material from a relatively low pressure zone to a relatively high pressure zone is usually done by means of a lock hopper system. By opening a first valve, the material is transferred from a storage vessel to a lock hopper. The valve is closed and the lock hopper is brought to an elevated gas pressure. A second valve, connecting the lock hopper to a vessel at elevated pressure, is then opened and the material is fed into this latter vessel and from there to the elevated pressure zone. The second valve is then closed and the gas pressure in the lock hopper is reduced. Opening the first valve marks the beginning of a new cycle.

This process is discontinuous. Moreover, the valves connecting the vessels become badly worn by the abrasive effect of the material, in combination with the frequent opening and closing. Regular replacement of these valves becomes necessary. The invention seeks to overcome these problems.

SUMMARY OF THE INVENTION

Accordingly, the invention relates to a process for transporting particulate material from a low pressure zone to a gas-containing elevated pressure zone comprising passing particulate material from a low pressure zone to the top of the first vessel of a series of at least two gas-containing vertically oblong vessels, passing the material by gravity as a moving bed from the top of each respective vessel of the series to the bottom of the respective vessel, and passing material from the bottom of each respective vessel to the top of the succeeding vessel, except the last vessel, thereby achieving a flow of the particulate material through the vessels, the gas pressure in the series of vessels being so regulated that then gas pressure increases from the first vessel to the last vessel in the series, the gas pressure at the top of each respective vessel in the series, other than the first vessel, being the same as the gas pressure at the bottom of the respective preceding vessel, and the material being passed in such quantity and at such rate or velocity that gas does not escape from the bottom of a respective vessel to the top of that vessel;

and discharging material at the bottom of the last vessel in the series to the elevated pressure zone.

The process according to the invention has the advantage that it is continuous, and no valves are used which would be subjected to abrasion by the material. According to the invention, the gas pressure is built up stagewise in a number of vessels arranged in series. The gas pressure applied at the bottom of each vessel is such that the pressure difference between the bottom and the top is too small to cause fluidization. This insures that no gas, or almost no gas, escapes from the top of the vessel, which means that no gas, or almost no gas, need to be supplied to the bottom of the vessels in order to maintain the higher gas pressure. The stagewise pressure build-up according to the invention enables relatively large pressure differences to be overcome with relatively low vessels.

The material can be transported to the top of each of the vessels either pneumatically or mechanically. If it is transported pneumatically to a vessel by a carrier gas, this carrier gas must flow continuously to each vessel, and the carrier gas has to be separated in the vessel from the material. This can be done by means of, for example, a cyclone or a filter. Preferably, however, the material is transported mechanically to each of the vessels. A variety of mechanical devices can be used, such as screw conveyors, vibration conveyors, or elevators. Preferably, the material is transported to the first vessel by means of an elevator.

In regard to the transport of the material to each of the respective subsequent vessels, consideration should be given to a regular discharge from the bottom of the respective preceding vessel. Discharge can be regulated by means of a star valve or by a screw conveyor. Preferably, the material is discharged from the bottom of a vessel by a screw conveyor which transports the material to an elevator which in turn carries it to the top of the next vessel. It is therefore advantageous to transport the material from the bottom of each vessel to the top of the next one by means of a screw conveyor and an elevator.

The discharge from the last vessel is done mechanically or pneumatically. Which is preferable depends on the purpose for which the material is being transported to the high pressure zone. For example, coal powder is preferably carried to a high-pressure gasifier by means of an inert carrier gas. In this case, it is preferably to transport the coal powder pneumatically from the bottom of the last vessel to the gasifier.

During the transport of the material from the top of the bottom, the particles in each of the vessels can adhere to one another and cause bridging so that the transport becomes irregular or even stops altogether. This is particularly likely to happen with fine cohesive substances. For this reason, the material in each vessel is preferably subjected to vibration. To this end, one or more vibrators can be installed in each vessel, preferably in the side wall. The vibrators can operate continuously or intermittently. Bridging can also be prevented by keeping the material in motion in other ways, for example by means of a stirring installation or gas injection.

Due to the fact that the gas pressure at the bottom of each vessel is higher than that at the top of the vessel, the gas tends to flow from the bottom to the top. This is opposed by the downward flowing material particles. It is preferable to carry out the process according to the invention in such manner that the gas pressure at the bottom of each vessel is maintained without gas escaping from the top and without gas being entrained with the material particles. If gas is entrained with the material, it ends up at the bottom of the last vessel and is carried away with the material to the high-pressure zone. This may sometimes be undesirable. The material is therefore preferably passed to the bottom of each vessel at such a rate or velocity that the velocity with which the material passes a certain horizontal cross-section of the vessel is equal to the upward velocity of the gas relative to the material at the cross-section. The gas velocity is influence by the pressure difference over the material bed and the height of the bed. Care is preferably taken, therefore, by maintaining the correct rate of material supply with the aid of, for example, the elevator, to ensure that the bed height of the material does not fall.

To secure the pressure build-up, the gas pressure in each vessel can be advantageously regulated with the aid of a common pressurized gas system. To this end, the vessels are each connected to a pressurized gas line. Reducing valves enable gas at the correct pressure to be introduced into each vessel if the pressure in the vessel falls too low. In addition, each vessel has a gas outlet via which gas is discharged to, for example, a gas re-processing plant if the pressure in the vessel becomes too high. Preferably, the gas lines are laid near the top of each vessel above the material bed, since gas lines located here, not being in contact with solid material, will not become polluted with solid material, even without special precautions, such as filters. It is also possible to connect just the top of the last vessel to a pressurized gas line and to connect the other vessels to one another at their tops by means of lines containing reducing valves. If the gas pressure at the top of a vessel becomes too high, gas can be led via a line and a reducing valve to the previous vessel. If the gas pressure at the top of the vessel becomes too low, gas is fed via another line with reducing valve from the next vessel.

If the material at the bottom of the last vessel is discharged by a carrier gas, a similar gas can be used in the pressurized gas system. Incidentally, only a small quantity of gas will be consumed if the installation works normally, since according to the invention practically no gas escapes from the top of each vessel.

Although the process according to the invention can be used for transporting material from a zone at any low pressure, the low pressure will generally be atmospheric. Material with a wide particle size distribution can be used in the present process. The mean particle size is not critical either. Preferably, the material has a mean particle size of 0.005 to 0.1 mm and a particle size distribution of 0.001 to 3.0 mm.

An important field of application of the present invention is high pressure gasification of a solid fuel such as coal, brown coal, peat, wood, etc. Preferably, the process is applied when the material is a solid particulate fuel and the fuel is transported at a pressure of 3.5 to 50 bar from the last vessel to a gasification reactor where it is advantageously gasified at a pressure of 3 to 40 bar with the aid of an oxygen-containing gas and/or steam to synthesis gas containing mainly carbon monoxide and hydrogen. The fuel can be transported to the reactor pneumatically, e.g., by an inert gas such as nitrogen, carbon dioxide or purified synthesis gas acting as carrier gas. A gas of this sort can also be used in the pressurized gas system, if present.

If the process according to the invention is used with the gasification of a fuel, air must be prevented from being carried along with the fuel from the last vessel to the gasification reactor. This can be done by bringing the fuel from a bunker with an inert gas atmosphere. Alternatively, the gas pressure at the bottom of the first vessel can be made so high by an inert gas that no air flows downwards and so all the air around the fuel is displaced by inert gas.

In the process for transporting fuel to a high-pressure gasification reactor, use is preferably made of 2 to 9 vessels. At the bottom of each vessel a gas pressure is advantageously applied which is 2 to 6 bar higher than the gas pressure at the top of that vessel. The height of the vessels is preferably between 30 and 100 m.

The invention will now be explained in greater detail with reference to the schematic figure, to which the invention is not limited. Ancillary apparatus, such as valves, compressors and pumps, are, in general, not shown in the FIGURE.

An elevator (1) transports a particulate material e.g., coal, continuously to the top of a vessel (2). The material flows as a moving bed to the bottom, from which it is transported by a screw conveyor (3) to an elevator (5). The elevator (5) is housed in a closed pipe (4) which connects the vessel (2) gas-tightly to a vessel (6). The material fed by the elevator (5) to the top of the vessel (6) passes down to the bottom of the vessel (6). From there a screw conveyor (7) transports the material to an elevator (9). The elevator (9) is surrounded by a pipe (8) which connects the vessel (6) gas-tightly to a vessel (10). In the same way as in vessels (2) and (6), the material in the vessel (10), brought by the elevator (9), is passed to a screw conveyor (11) in the bottom and from there to an elevator (13). By means of the elevator (13), which is surrounded by a pipe (12) which connects the vessel (10) gas-tightly to a vessel (14), the material is transported to the top of the vessel (14). It is passed down, and at the bottom it is discharged pneumatically via a pipe (15). The carrier gas for the pneumatic transport comes via a line (16).

The pressure build-up is achieved and regulated with the aid of a compressed gas system. The carrier gas, coming via the line (16), is at the desired elevated pressure. Via line (17), and possibly a reducing valve, a pressure is applied to the top of vessel (14) such that the pressure difference between the top and bottom of vessel (14) is smaller than the pseudo-hydrostatic pressure of the solid material in the vessel (14). By an appropriate choice of the downward velocity of the material, it can be insured that almost no gas flows from the bottom to the top.

Since the top of the vessel (14) is connected gas-tightly by the pipe (12) to the bottom of vessel (10), the pressure prevailing there is also almost the same as at the top of vessel (14). The tops of the vessels (10) and (14) are connected to each other by a gas line (19). A reducing valve (20) in the line (19) is adjusted such that the difference between the pressure at the bottom and the pressure at the top is less than the pseudo-hydrostatic pressure of the material in the vessel (10). Functioning similarly to the line (19) is a line (21) with a reducing valve (22) between the tops of vessels (6) and (10). The pressure at the bottom of the vessel (6) is almost the same as that at the top of the vessel (10) on account of the gas-tight connection by the pipe (8). Similarly, the pressure at the bottom of vessel (2) is almost the same as that at the top of vessel (6).

The pressure build-up is regulated with the aid of this pressurized gas system. If the pressure at the top of one of the vessels becomes too high, the pressure is vented to the set value via the line connecting the vessel with the preceding one. If this happens in vessel (6), the excess gas is discharged to a gas re-processing plant (not shown in the figure). If the pressure at the top of a vessel becomes too low, gas at a higher pressure is supplied via the line connecting the vessel in question to the top of the next one until the pressure in the vessel has reached the correct value.

In order to illustrate the invention, the following illustration is given. All values are calculated or exemplary.

In an installation, basically as described in the figure, 10000 kg/h of coal powder in a series of 4 vessels is brought to a pressure of 21 bar. The vessels are 85 m high and have a diameter of 0.56 m. Coal powder is added continuously via the elevators at a sufficient rate to maintain the height of the coal powder beds at 78.4 m. The velocity at which the coil powder is carried downwards amounts to 1.81 m/s. The pressure at the bottom of vessels (2), (6), (10) and (14) is 6, 11, 16 and 21 bar respectively.

What is claimed is:

1. A process for transporting particulate material from a low pressure zone to a gas-containing elevated pressure zone comprising passing particulate material from said low pressure zone to the top of a first gas-containing vertically oblong vessel;

passing said material by gravity as a moving bed from the top of the first vessel to the bottom of the vessel;

passing said material from the bottom of the first vessel to the top of a second gas-containing vessel, the gas at the bottom of the first vessel being at greater pressure than the gas at the top of the first vessel, the gas pressure at the top of the second vessel being the same as the gas pressure at the bottom of the first vessel, and said material being passed in such quantity and at such rate that gas does not escape from the bottom of the first vessel to the top of the first vessel;

passing said material from the top of the second vessel by gravity as a moving bed to the bottom of the second vessel, the gas at the bottom of the second vessel being at greater pressure than the gas at the top of the second vessel, said material being passed in such quantity and at such rate that gas does not escape from the bottom of the second vessel to the top of the second vessel, and discharging said material from the bottom of the second vessel to an elevated pressure zone.

2. A process for transporting particulate material from a low pressure zone to a gas-containing elevated pressure zone comprising passing particulate material from said low pressure zone to the top of a first gas-containing vertically oblong vessel;

passing said material by gravity as a moving bed from the top of the first vessel to the bottom of the vessel;

passing material from the bottom of the first vessel to the top of a second gas-containing vertically oblong vessel, the gas at the bottom of the first vessel being at greater pressure than the gas at the top of the first vessel, the gas pressure at the top of the second vessel being the same as the gas pressure at the bottom of the first vessel, and said material being passed in such quantity and at such rate that gas does not escape from the bottom of the first vessel to the top of the first vessel;

passing said material from the top of the second vessel by gravity as a moving bed to the bottom of the second vessel, the gas at the bottom of the second vessel being at greater pressure than the gas at the top of the second vessel, said material being passed in such quantity and at such rate that gas does not escape from the bottom of the second vessel to the top of the second vessel, passing said material from the bottom of the first vessel to the top of a third gas-containing vertically oblong vessel, the gas pressure at the top of the third vessel being the same as the gas pressure at the bottom of the second vessel, passing said material from the top of the third vessel by gravity as a moving bed to the bottom of the third vessel, the gas at the bottom of the third vessel being at a greater pressure than the gas at the top of the third vessel, said material being passed in such quantity and at such rate that gas does not escape from the bottom of the third vessel to the top of the third vessel, and discharging said material from the bottom of the third vessel to an elevated pressure zone.

3. A process for transporting particulate material from a low pressure zone to an elevated pressure gas-containing zone comprising (a) passing particulate material from said low pressure zone to the top of the first vessel of a series of gas-containing vertically oblong vessels arranged in such manner that the top of each vessel, after the first, communicates with the bottom of the preceding vessel in the series, (b) passing said material by gravity as a moving bed to the bottom of the first vessel;

(c) transferring said material from the bottom of the first vessel to the top of the succeeding vessel, and passing said material by gravity as a moving bed to the bottom of said succeeding vessel;

(d) repeating the transfer to the top of, and downward movement of the particulate material in, each respective succeeding vessel in the series, in such manner that said material is transferred in succession through the series of vessels, the gas pressure in the series of vessels being so regulated that the gas pressure increases from the first vessel to the last vessel in the series, the gas pressure at the top of each respective vessel in the series, other than the first vessel, being the same as the gas pressure at the bottom of the respective preceding vessel in the series, said material being passed downward by gravity in such quantity and at such rate in each respective vessel that gas does not escape from the bottom of a respective vessel in the series to the top of that respective vessel; and discharging said material at the bottom of the last vessel in the series to an elevated pressure zone.

4. The process of claim 3 in which the material is transported from the bottom of each respective vessel to the top of the next respective vessel by means of a screw conveyor and an elevator.

5. The process of claim 4 in which the material is discharged pneumatically from the bottom of the last vessel.

6. The process of claim 5 in which the gas pressure at the top of the first vessel is atmospheric.

7. The process of claim 6 in which the material is a solid fuel.

8. The process of claim 7 in which the fuel is coal.

9. The process of claim 8 in which the coal is transported at a pressure of 3.5 to 50 bar from the last vessel to a gasification reactor.

10. The process of claim 9 in which, at the bottom of each respective vessel, a gas pressure is applied which is 2 to 6 bar higher than the gas pressure at the top of that vessel.

11. The process of claim 3 in which the particulate material is coal.

12. The process of claim 11 in which the coal is transported from the bottom of each respective vessel to the top of the next respective vessel by means of a screw conveyer and an elevator.

13. The process of claim 11 in which the coal is transported from the bottom of each respective vessel to the top of the next respective vessel pneumatically.

14. The process of claim 13 in which the gas used in the gas-containing vertically-oblong vessels is selected from nitrogen, carbon dioxide, or purified synthesis gas.

* * * * *